(12) United States Patent
Wakitani et al.

(10) Patent No.: US 9,474,980 B2
(45) Date of Patent: Oct. 25, 2016

(54) CONTROLLER COVER

(71) Applicant: Nintendo Co., Ltd., Kyoto (JP)

(72) Inventors: Noboru Wakitani, Kyoto (JP); Junji Takamoto, Kyoto (JP); Kenichiro Ashida, Kyoto (JP); Masato Ibuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/324,568

(22) Filed: Jul. 7, 2014

(65) Prior Publication Data

US 2014/0323230 A1  Oct. 30, 2014

Related U.S. Application Data

(63) Continuation of application No. 13/458,153, filed on Apr. 27, 2012, now Pat. No. 8,777,745, which is a continuation of application No. 12/153,107, filed on May 14, 2008, now Pat. No. 8,215,483.

(51) Int. Cl.
*A63F 13/00* (2014.01)
*A63F 13/98* (2014.01)
*A63F 13/20* (2014.01)
*A63F 13/24* (2014.01)

(52) U.S. Cl.
CPC .............. *A63F 13/98* (2014.09); *A63F 13/02* (2013.01); *A63F 13/06* (2013.01); *A63F 13/24* (2014.09)

(58) Field of Classification Search
CPC ..................... H01H 9/0214; H01H 9/0242
USPC ........................................... 463/47
See application file for complete search history.

(56) References Cited

U.S. PATENT DOCUMENTS

| 4,824,059 A | | 4/1989 | Butler | |
|---|---|---|---|---|
| 4,836,256 A | * | 6/1989 | Meliconi | H01H 9/0242 206/305 |
| 5,265,720 A | * | 11/1993 | Meliconi | H01H 9/0242 150/165 |

(Continued)

FOREIGN PATENT DOCUMENTS

| CN | 2149065 | 12/1993 |
|---|---|---|
| GB | 2333402 | 7/1999 |

(Continued)

OTHER PUBLICATIONS

Trustmaster, "Thrustmaster T-Protect NW Review," http://www.ign.com/articles/2007/03/21/thrustmaster-t-protect-nw-review. Created Mar. 21, 2007.*

(Continued)

*Primary Examiner* — Reginald Renwick
(74) *Attorney, Agent, or Firm* — Nixon & Vanderhye PC

(57) ABSTRACT

A controller cover includes a main body portion attached to an outer surface of a controller, and the main body portion includes a contacted portion where a contacted inner surface is in contact with the outer surface of the controller and a non-contacted portion where a non-contacted inner surface is not in contact with the outer surface of the controller. Elastic deforming protrusions are formed on the non-contacted inner surface. When the controller attached with the cover interferes with other thing, and the non-contacted portion of the cover is subjected to shock, the elastic deforming protrusion of the non-contacted portion is deformed to ease the shock, so that the controller and the interfering other thing are protected.

16 Claims, 13 Drawing Sheets

(56) References Cited

U.S. PATENT DOCUMENTS

| | | | | |
|---|---|---|---|---|
| 5,360,108 | A * | 11/1994 | Alagia | 206/320 |
| 5,368,159 | A * | 11/1994 | Doria | 206/320 |
| 5,648,757 | A | 7/1997 | Vernace et al. | |
| 6,701,159 | B1 * | 3/2004 | Powell | A45C 11/00 379/446 |
| 7,731,191 | B2 * | 6/2010 | Sternberg | 273/148 B |
| 8,215,483 | B2 | 7/2012 | Wakitani et al. | |
| 2007/0142077 | A1 * | 6/2007 | Huang | A63F 13/06 455/550.1 |
| 2007/0247793 | A1 * | 10/2007 | Carnevali | G06F 1/1626 361/679.1 |
| 2012/0270662 | A1 | 10/2012 | Wakitani et al. | |

FOREIGN PATENT DOCUMENTS

| | | |
|---|---|---|
| JP | S48-52706 | 7/1973 |
| JP | 63-170984 | 11/1988 |
| JP | 01-199290 | 4/1989 |
| JP | 03-159299 | 7/1991 |
| JP | 09-271080 | 10/1997 |
| JP | 10-256740 | 9/1998 |
| JP | 2000-232271 | 8/2000 |
| JP | 2002-507814 | 3/2002 |
| JP | 2004-180718 | 7/2004 |
| JP | 2006-196776 | 7/2006 |
| JP | 03-132531 | 3/2007 |
| WO | 9207372 | 4/1992 |

OTHER PUBLICATIONS

Switch N' Carry. http://www.ign.com/articles/2006/11/20/switch-n-carry-wii-accessories-reviews. Created Nov. 20, 2006.*
Digital World Tokyo. http://www.digitalworldtokyo.com/index.php/digital_tok/articles/turn_your_wiimote_into_real_sports_gear_with_plastic_attachments/. Created Jan. 15, 2007.*
CNET , "Logitech Harmony 720 Review", http://www.cnet.com/products/logitech-harmony-720/. Created Aug. 1, 2006.*
Logitech Harmony 720 Manual.*
Chinese Office Action dated Apr. 1, 2012 (with English translation) for corresponding Chinese Patent Application No. 200810127930.8 filed Aug. 6, 2007, (12 pages).
Office Action dated Oct. 26, 2012, corresponding to Chinese Application No. 200810127930.8 with English translation and accompanying Search Report (9 pages).
European Search Report issued Jul. 14, 2010 for European Application No. EP 08156767.9 (8 pages).
Office Action dated Jan. 22, 2013 corresponding to Japanese Application No. 2007-204109 (3 pages).
Office Action dated May 5, 2013, with English translation, corresponding to Taiwanese Application No. 097118454 (11 pages).

* cited by examiner

FIG. 2
(A)
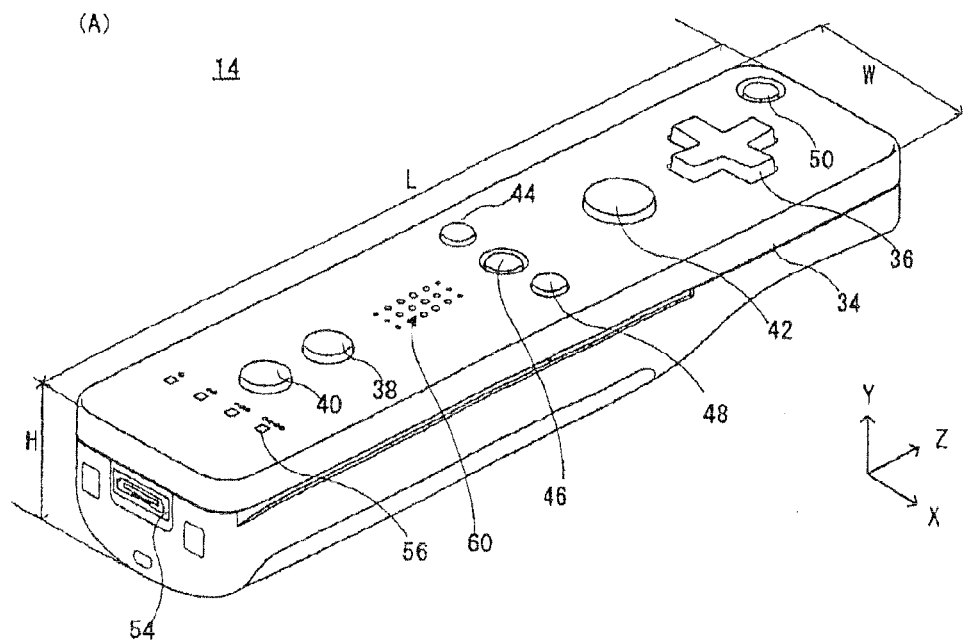
(B)
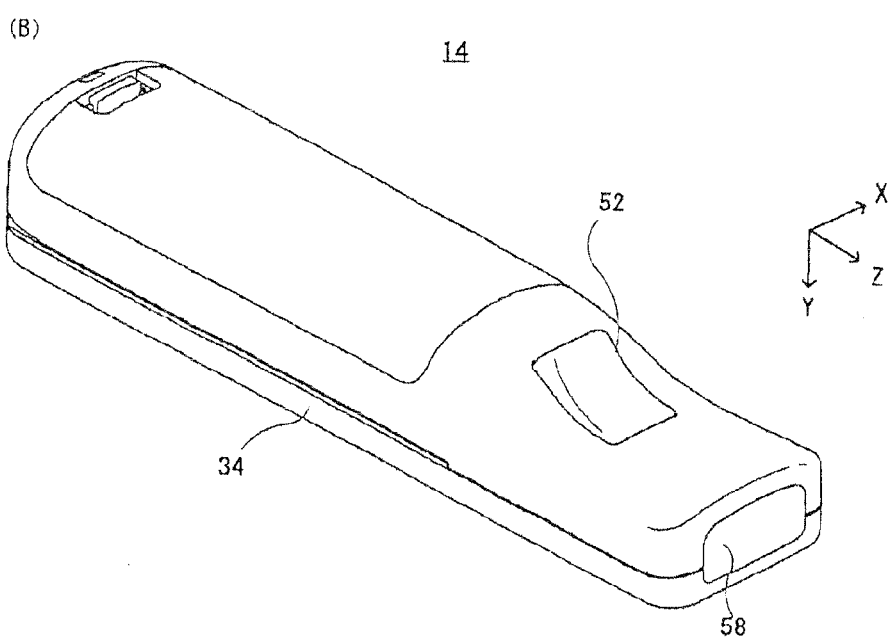

FIG. 4
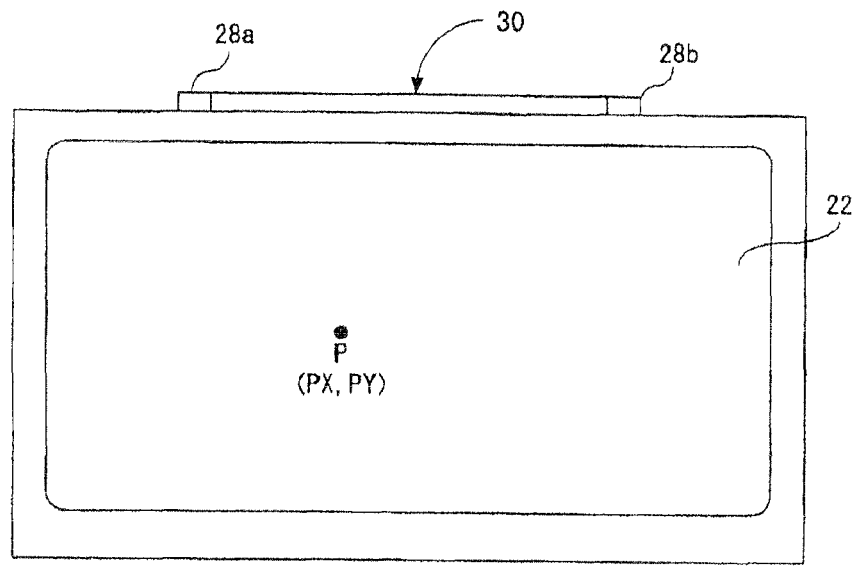
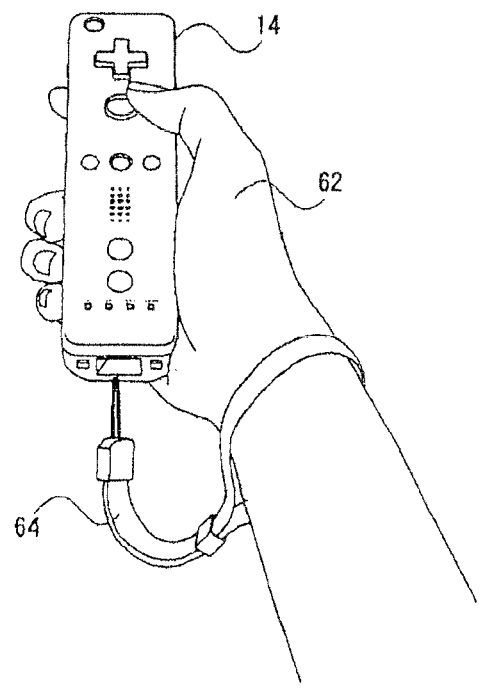

FIG. 8
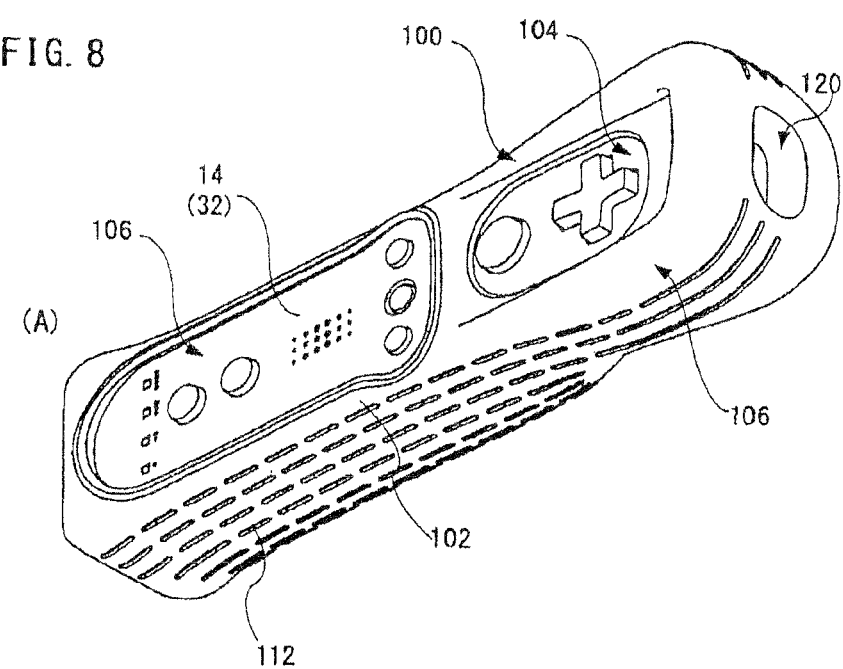
(A)
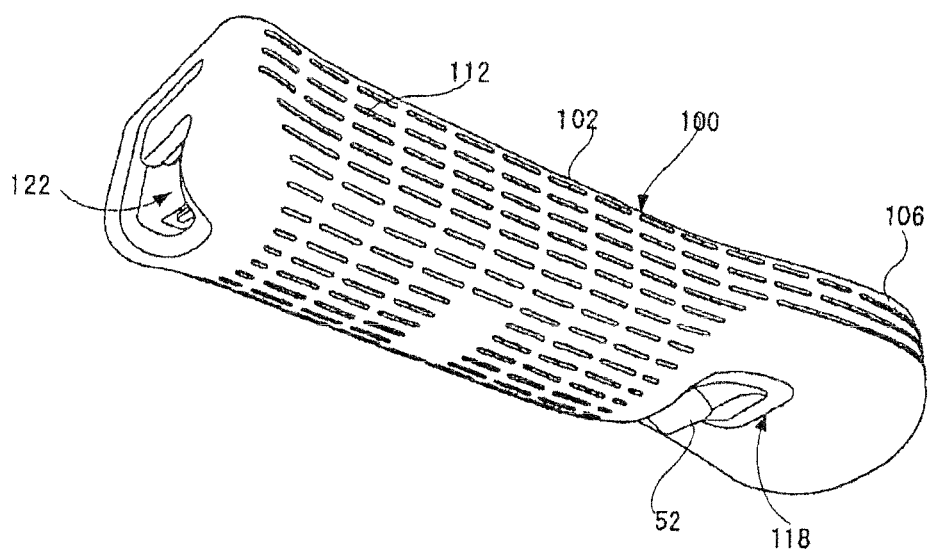
(B)

FIG. 10
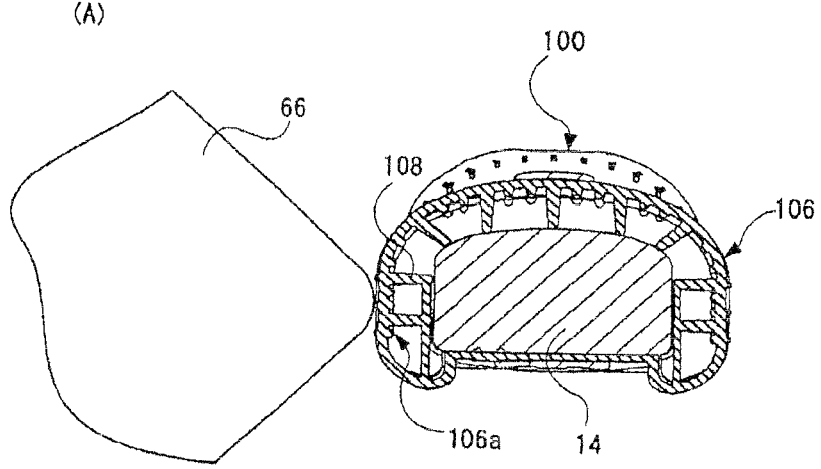
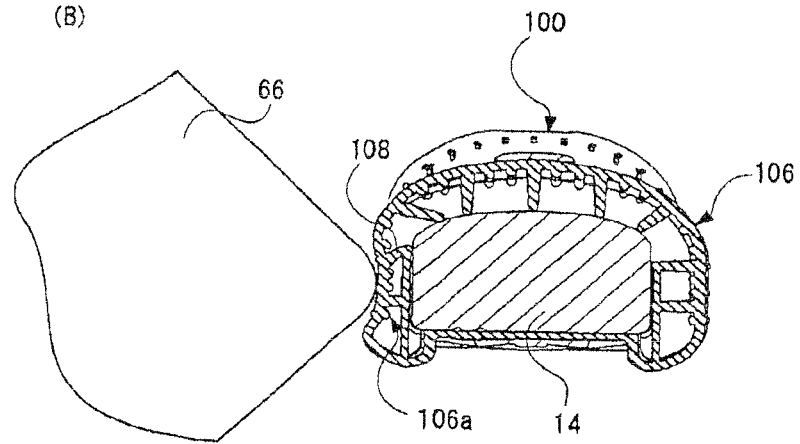

FIG. 12
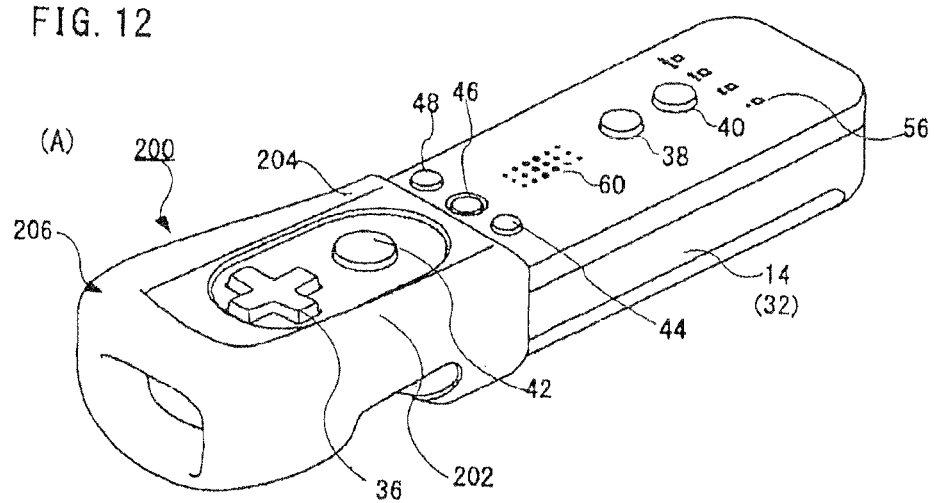
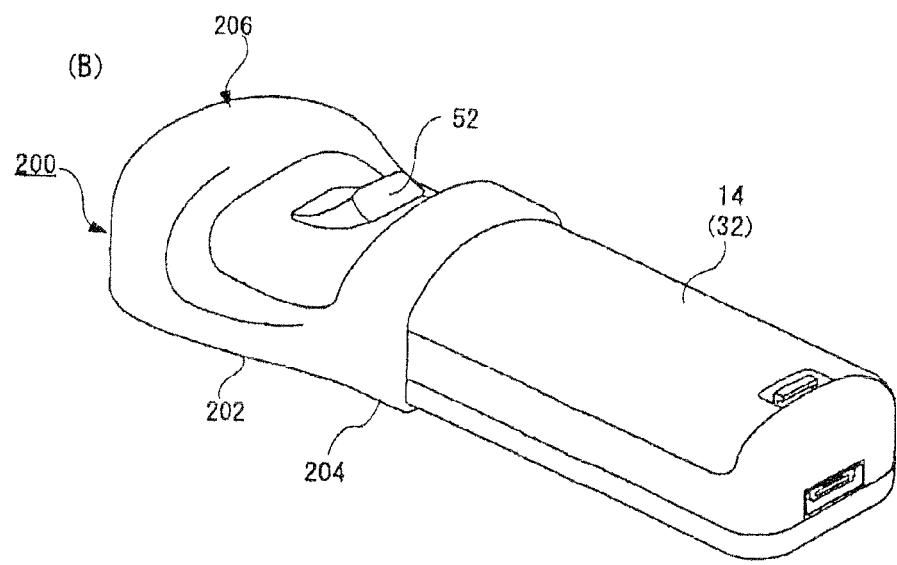

CONTROLLER COVER

CROSS REFERENCE OF RELATED APPLICATIONS

This application is a continuation of application Ser. No. 13/458,153 filed Apr. 27, 2012, now allowed, which is a continuation of application Ser. No. 12/153,107 filed May 14, 2008, now U.S. Pat. No. 8,215,483, which claims priority of Japanese Patent Application No. 2007-204109 filed Aug. 6, 2007, the entire contents of each of which is hereby incorporated by reference in this application.

BACKGROUND OF THE INVENTION

1. Field of the Invention

The invention relates to a controller cover. More specifically, the present invention relates to a controller cover attached to a controller which is held by a hand of a user or a game player and operated in a real space for inputting operation information to a game apparatus.

2. Description of the Related Art

Conventionally, in view of sanitation and prevention of damage due to drop, or the like, electronic equipment with cover, such as a game controller, etc. has been known.

Patent Document 1 (Japanese Unexamined Patent Application Publication No. 2002-507814 [G06F 3/033, A63F 13/06]) recites that in order to significantly avoid problems in relation to holdability and sanitation, a handle of a joypad for computer operation is attached with a cover like a stocking.

Patent Document 2 (Japanese Utility Model Application Laid-Open Publication No. 63-17098 4[A05K 5/03, H04N 5/00, 5/64]) recites that a protective cover is constructed by a holder member of a hollow-body made of material with shake-resistance and low density which is formed to be conformed to the appearance of a remote controller, and the holder member is made thick enough to absorb shock applied to the remote controller, and whereby, it is possible to protect the controller from the shock imparted from the outside.

In addition, Patent Document 3 (Japanese Patent Application Laid-Open No. 2006-196776 [H05K 5/02]) recites that a plurality of shock absorbing rubbers are arranged on the bottom of a case main body, and electronic equipment is mounted on the upper surfaces of these shock absorbing rubbers, and thereby, if shock force is applied to the case due to drop, etc., the shock absorbing rubbers are deformed to protect the electronic equipment.

The above-described Patent Document 1 is for avoiding problems in relation to holdability of the joypad and sanitation, and not for protecting the joy pad and other things from the shock occurring between them.

Furthermore, the above-described Patent Document 2 is for imparting sufficient thickness to the wall surface of the holder member made of a material with low density, light weight, and shake-resistance for absorbing shock imparted to the remote control device. Thus, there is a problem of high material costs for forming the holder member with sufficient thickness, resulting in a high price.

In addition, the Patent Document 3 can protect the electronic equipment by the shock absorbing rubbers, but has a problem of not protecting other things from shock when shock occurs between the case main body and other things because the case main body itself does not have structure of absorbing the shock.

SUMMARY OF THE INVENTION

Therefore, it is a primary object of the present invention to provide a novel controller cover.

Another object of the present invention is to provide a controller cover being cheap and capable of protecting the controller and other object from a shock between them.

The present invention employs following features in order to solve the above-described problems. It should be noted that reference numerals inside the parentheses and supplement show one example of a corresponding relationship with the embodiments described later for easy understanding of the present invention, and does not limit the present invention.

A first invention is a controller cover utilized for a controller which a user holds and moves to thereby output operation information in accordance with the motion, comprises: a main body portion made of an elastic material and attached to an outer surface of the controller; and a shock absorbing portion formed around the main body portion.

In the first invention, a controller cover (100: a reference numeral of the game apparatus when a corresponding component in the embodiments is designated. This hold true for the later.) includes a main body portion (102) to be attached to an outer surface of the controller (14). A shock absorbing portion (106, 108) is formed around the main body portion, on an inner surface or an outer surface thereof.

According to the first invention, when the controller is held with the hand of the user and swung in a real space, the controller might contact persons and objects around it in some situations. However, even if the controller and other thing (persons and objects) are contacted, the shock absorbing portion eases the shock in the contact, so that it is possible to protect both of them from the shock.

A second invention is a controller cover according to the first invention, and the controller has a longitudinal configuration, and a length is set such that one end portion of the longitudinal configuration is exposed from the hand when it is held by the user, and the shock absorbing portion is formed so as to cover at least the one end portion of the controller.

In the second invention, in a case that one end portion of the controller is exposed from the hand holding the controller, even if the one end portion interferes with other thing (persons and objects) to bring about a shock, the shock absorbing portion covers the one end portion, capable of easing the shock.

A third invention is a controller cover according to the first invention or the second invention, and the main body portion includes a contacted portion having a contacted inner surface being in contact with the outer surface of the controller and a non-contacted portion having a non-contacted inner surface not being in contact with the outer surface, and the shock absorbing portion includes the non-contacted portion.

In the third invention, the main body portion (102) includes a contacted portion (104) having a contacted inner surface (104*a*) being in contact with the outer surface of the controller and a non-contacted portion (106) having a non-contacted inner surface (106*a*) not being in contact with the outer surface, and the non-contacted portion functions as a shock absorbing portion. That is, when a shock is imparted to the controller cover, a space is formed between the non-contacted inner surface and the outer surface of the controller, and therefore, the controller cover is deformed within the range of the space by the shock. By the elastic deformation, it is possible to ease the shock. Accordingly, only provision of the space between the main body portion and the controller is valuable for shock absorption. Furthermore, in the third invention, shock absorption is performed at the non-contacted inner surface without making the main body portion thick, and therefore, this has an advantage of offering a cheap controller cover saving in material costs in comparison with a thick shock absorbing portion.

A fourth invention is a controller cover according to the third invention, and the shock absorbing portion includes elastic deforming protrusions formed on the non-contacted inner surface, and the elastic deforming protrusions are brought into engagement with the outer surface of the controller.

In the fourth invention, the non-contacted inner surface (106) is provided with elastic deforming protrusions (108), and the elastic deforming protrusions are brought into engagement with the outer surface of the controller. If shock is imparted to the controller cover, the elastic deforming protrusion between the non-contacted inner surface and the outer surface of the controller is elastically deformed by the shock. By the elastic deformation of the protrusion, it is possible to absorb and ease the shock. Furthermore, in the fourth invention also, the thickness of the main body portion needs not to be increased, and therefore, this has an advantage of offering a cheap controller cover similar to the third invention.

A fifth invention is a controller cover according to the fourth invention, and wherein the elastic deforming protrusions include continuous protrusions.

In the fifth invention, the continuity of the elastic deforming protrusions imparts strength to the protrusions and allows easy deformation by the shock and easy restoration after cancellation of the shock. In a case that the elastic deforming protrusions are made continuous, the protrusion has certain degree of strength, and therefore, when the controller cover is put out from the metal mold in the injection molding, there is an advantage of preventing the inconvenience of tearing out the protrusions, or the like from occurring.

As a form of the continuity of the continuous protrusions, there are plate-like or rib-like continuous protrusions extending in a predetermined direction, continuous protrusions in which such the plate-like (rib-like) continuous protrusions are connected in the form of grid, in the form of honeycomb or in the form of ring in a top view. In addition, continuous protrusions are considered in which the plate-like (rib-like) protrusions connected in the form of grid, in the form of honeycomb or in the form of ring are successively or intermittently arranged.

A sixth invention is a controller cover according to the fourth invention, and the elastic deforming protrusions include independent protrusions each deforming independently.

In the sixth invention, needle-like or rod-like independent protrusions, for example, are formed.

A seventh invention is a controller cover according to the first invention or the second invention, and the shock absorbing portion includes a double wall surface portion formed on the main body portion and a shock absorbing material enclosed in the double wall surface portion.

In the seventh invention, the main body portion is provided with a double wall surface portion (124), and in the double wall surface portion (124), a shock absorbing material (126) such as gas like air, liquid, gel, or the like is enclosed. In a case that shock is imparted to the controller cover and surrounding other things (persons and objects), the shock can be absorbed and eased by the shock absorbing material (126) to thereby protect both of them from the shock.

An eighth invention is a controller cover depending on the first invention or the second invention, and the shock absorbing portion includes elastic deforming protrusions formed on the outer surface of the main body portion.

In the eighth invention, in a case that elastic deforming protrusions (108') are formed on the outer surface of the main body portion, and shock is imparted to the controller cover and surrounding other things (persons and objects), the shock can be absorbed and eased by the elastic deforming protrusions (108') to thereby protect both of them from the shock.

A ninth invention is a controller cover according to any one of the first to eighth inventions, and the main body portion covers an entire portion of the controller, and further comprises a non-slip portion formed on the outer surface of at least a part of the main body portion.

In the ninth invention, by forming the non-slip portion (112) on the outer surface of the main body portion of the cover, even when a child with less holding force operates the controller, it is possible to prevent the controller from dropping and slipping from the hand.

According to the present invention, if shock is imparted to the controller cover, the shock is eased at the shock absorbing portion of the cover, and therefore, it is possible to protect the game controller and other things from the shock occurring between them.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing an appearance of the controller utilized in this embodiment, FIG. 2(A) is a perspective view of the controller viewed from an upper rear side, and FIG. 2(B) is a perspective view of the controller viewed from a lower front side.

FIG. 4 is an illustrative view showing another form when the controller is utilized.

FIG. 5(A) is a perspective view showing a rear surface, an top surface and a right side surface of the cover, and FIG. 5(B) is a perspective view showing a front surface, a bottom surface and a left side surface of the cover.

FIG. 6(A) is a rear view showing the rear surface of the cover, FIG. 6(B) is a top view showing the top surface of the cover, FIG. 6(C) is a front view showing the front surface of the cover, FIG. 6(D) is a left side view showing the left side surface of the cover, and FIG. 6(E) is a bottom view showing the bottom surface of the cover.

FIG. 7(A) is a top view showing a top surface of the cover, FIG. 7(B) is a cross-sectional view taken along the line B-B in FIG. 7(A), FIG. 7(C) is a cross-sectional view taken along the line C-C in FIG. 7(A), FIG. 7(D) is a cross-sectional view taken along the line D-D in FIG. 7(A), and FIG. 7(E) a cross-sectional view taken along the line E-E in FIG. 7(A).

FIG. 8 is an illustrative view showing a state that the controller cover of this embodiment is attached to the controller, FIG. 8(A) is a perspective view showing the rear surface, the top surface and the right side surface of the cover in a state that the cover is attached to the controller, and FIG. 8(B) is a perspective view showing the front surface, the bottom surface and the left side surface of the cover in that state.

FIG. 9(A) is a top view showing the top surface of the cover in a state that the cover is attached to the controller, FIG. 9(B) is a cross-sectional view taken along the line B-B in FIG. 9(A), FIG. 9(C) is a cross-sectional view taken along the line C-C in FIG. 9(A), FIG. 9(D) is a cross-sectional view taken along the line D-D in FIG. 9(A), and FIG. 9(E) is a cross-sectional view taken along the line E-E in FIG. 9(A).

FIG. 10 is an illustrative view showing a cushioning effect (shock absorbing effect) of the cover in this embodiment when interference (contact) between the controller and other things arises.

FIG. 11(A) is a perspective view showing a back surface, a top surface and a right side surface of the cover, and FIG. 11(B) is a perspective view showing a front surface, a bottom surface and a left side surface of the cover.

FIG. 12 is an illustrative view showing a state that the controller cover in this embodiment is attached to the controller, FIG. 12(A) is a perspective view showing the back surface, the top surface and the right side surface of the controller attached with the controller, and FIG. 12(B) is a perspective view showing the front surface, the bottom surface and the left side surface in that state.

DETAILED DESCRIPTION OF THE PREFERRED EMBODIMENTS

Figure 1:
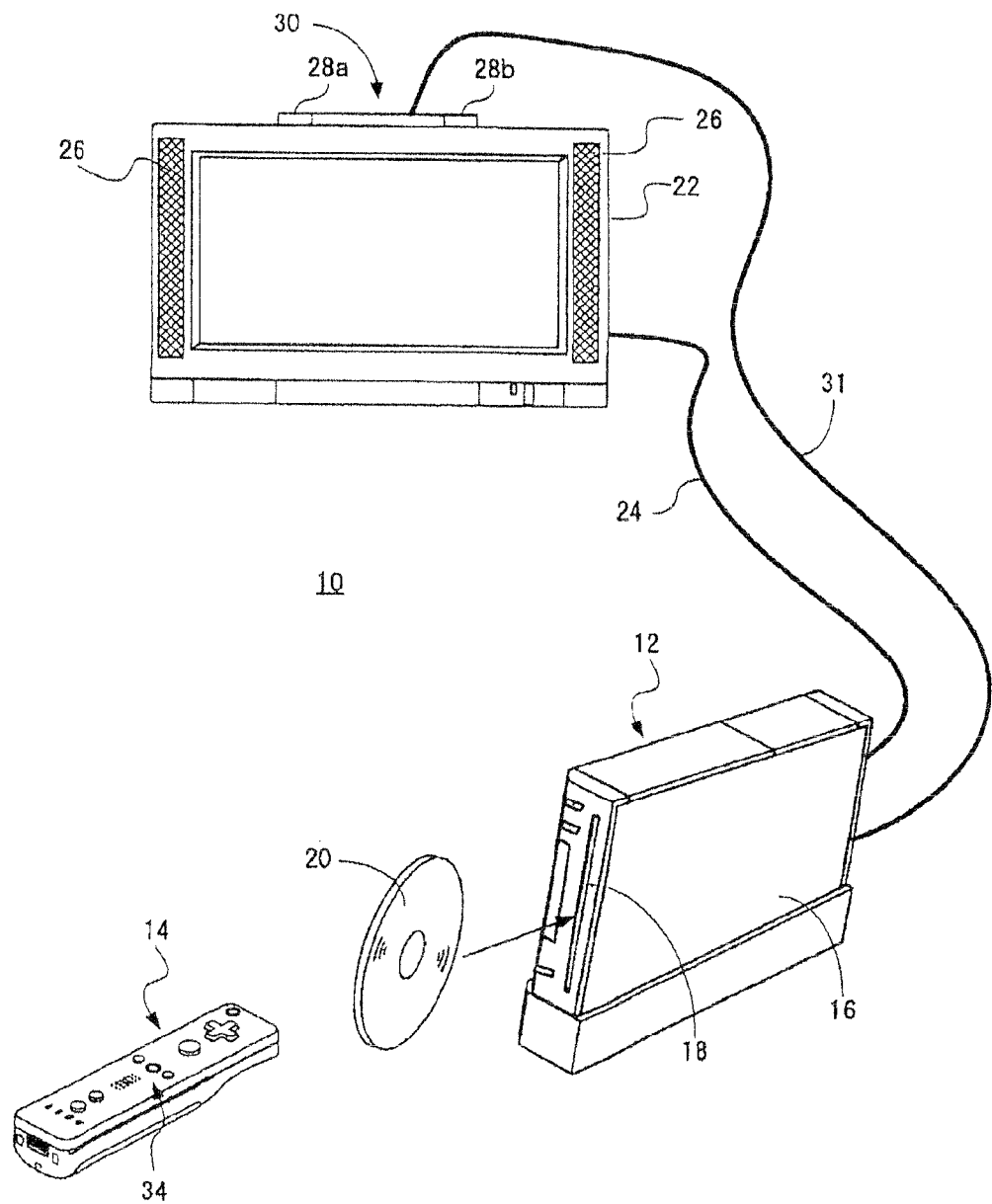
FIG. 1 is an appearance view showing one example of a game system including a game apparatus using a controller to which a cover in the present invention is applied.

A controller cover of the present invention can be applied, as one example, to a controller 14 capable of transmitting operation information (controller data) to a game apparatus 12 in a game system 10 shown in FIG. 1. The operation information or the operation signal from the controller 14 is transmitted to the game apparatus 12 by wireless communications such as Bluetooth (registered trademark), for example. In the game apparatus 12, game processing like updating a game image according to a game program and in response to such operation information or operation data is executed. However, the controller 14 may be connected to the game apparatus 12 by a cable.

The game apparatus 12 includes a roughly rectangular parallelepiped housing 16, and the housing 16 is furnished with a disk slot 18 on a front surface. From the disk slot 18, an optical disk 20 storing the above-described game program is inserted. The game program is read from the optical disk 20, and written to a memory of the game apparatus 12 so as to be used for the game processing in a processor (both are not illustrated).

The game apparatus 12 and a monitor 22 are connected with an AV cable 24, and through the AV cable 24, a video signal and a sound signal from the game apparatus 12 are input to the monitor 22. Accordingly, a game image of a three-dimensional (3D) video game, for example, is displayed on the screen of the monitor 22, and stereo game sound, such as a game music, a sound effect, etc. is output from right and left speakers 26. On the top side of the monitor 22, a marker unit 30 including two infrared ray LEDs (markers) 28a and 28b is provided. The marker unit 30 is connected to the game apparatus 12 through a power source cable 31. Accordingly, the marker unit 30 is supplied with power from the game apparatus 12 to allow the markers 28a and 28b to emit lights in front of the monitor 34.

FIG. 2(A) and FIG. 2(B) show one example of the appearance of the controller 14. FIG. 2(A) is a perspective view showing a front surface, a top surface and a right side surface of the controller 14, and FIG. 2(B) is a perspective view showing a back surface, a lower surface and a left side surface of the controller 14.

With reference to FIG. 2(A) and FIG. 2(B), the controller 14 has a housing 32 formed by plastic molding, for example. The housing 32 is formed into an approximately rectangular parallelepiped shape having the length L, the width W and the height H, and has a size small enough to be held by one hand of a user as a whole (especially, the width W and the height H). In relation to the length L, the controller 14 is designed in size to the extent that the one end (one end portion) of it is exposed from the hand when the user holds the controller 14 with the hand.

The housing 32 (controller 14) is provided with the input means (a plurality of buttons or switches) 34 (FIG. 1). Specifically, as shown in FIG. 2 (A), on an upper face of the housing 32, there are provided a cross key 36, a 1 button 38, a 2 button 40, an A button 42, a − button 44, a HOME button 46, a + button 48 and a power switch 50. Moreover, as shown in FIG. 2 (B), an inclined surface is formed on a lower surface of the housing 32, and a B-trigger switch 52 is formed on the inclined surface.

The cross key 36 is a four directional push switch, including four directions of front (or upper), back (or lower), right and left operation parts, By operating any one of the operation parts, it is possible to instruct a moving direction of a character or object (player character or player object) that is operable by the player or instruct the moving direction of a cursor.

The 1 button 38 and the 2 button 40 are respectively push button switches, and are used for adjusting a viewpoint position and a viewpoint direction on displaying the 3D game image, i.e. a position and an image angle of a virtual camera. Alternatively, the 1 button 38 and the 2 button 40 can be used for the same operation as that of the A-button 42 and the B-trigger switch 52 or an auxiliary operation thereof.

The A-button switch 42 is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, the A button 42 is utilized for instructing decision of an icon or a button image pointed by a pointer (instruction image) on the game screen. When the icon or the button image is decided, an instruction or a command (a command of the game) set in advance in correspondence with these can be input.

The − button 44, the HOME button 46, the + button 48, and the power supply switch 50 are also push button switches. The − button 44 is used for selecting a game mode. The HOME button 46 is used for displaying a game menu (menu screen). The + button 48 is used for starting (re-starting) or pausing the game. The power supply switch 50 is used for turning on/off a power supply of the game apparatus 12 by remote control.

The B-trigger switch 52 is also the push button switch, and is mainly used for inputting a trigger such as shooting and designating a position selected by the controller 14. In a case that the B-trigger switch 52 is continued to be pushed, it is possible to make movements and parameters of the player object constant. In a fixed case, the B-trigger switch 52 functions like the normal B-button, and is used for canceling the action determined by the A-button 42.

As shown in FIG. 2 (A), an external expansion connector 54 is provided on a back end surface of the housing 32, and an indicators 56 is provided on the top surface and on the side of the back end surface of the housing 32. The external expansion connector 54 is utilized for connecting another expansion controller (not shown) other than the controller 14. The indicator 56 is made up of four LEDs, for example, and shows identification information (controller number) of the controller 14 depending on the lighting LED by lighting any one of the four LEDs. Furthermore, the indicator 56 shows the remaining amount of a battery of the controller 14 depending on the number of LEDs to be emitted.

In addition, the controller 14 has a solid imager (not shown), and as shown in FIG. 2(B), light incident opening 58 of the imager is provided on the front end surface of the housing 32. Furthermore, the controller 14 has a speaker (not illustrated), and the speaker is provided inside the housing 32 at the position corresponding to a sound release hole 60 between the 1 button 38 and the HOME button 46 on the tope surface of the housing 32 as shown in FIG. 2 (A).

Note that the shape of the controller 14 and the shape, number and setting position of each input means 34 shown in FIG. 2 (A) and FIG. 2 (B) are merely examples and may be modified as necessary.

In the controller 14 shown in FIG. 2, although not illustrated, a means for detecting an orientation and a moved state of the controller 14 is included. As such a means, an acceleration sensor (not illustrated) is typically considerable.

The acceleration sensor detects, as shown in FIG. 2, accelerations in respective directions of a vertical (y-axis) direction, a horizontal (x-axis) direction, a forward and backward (z-axis) direction of the controller 14. An acceleration signal from the acceleration sensor is applied to a processor (not illustrated) similarly included in the controller 14 to thereby allow the processor to fetch acceleration data. The acceleration data is transmitted from the processor to a wireless module as controller data (operation signal) together with an input signal (input data) by the input means 34, and these controller data (operation signals) are transmitted to the game apparatus 12 from the wireless module. The game apparatus 12 performs application processing (game processing) according to the fetched controller data and the application program (game program).

Figure 3:
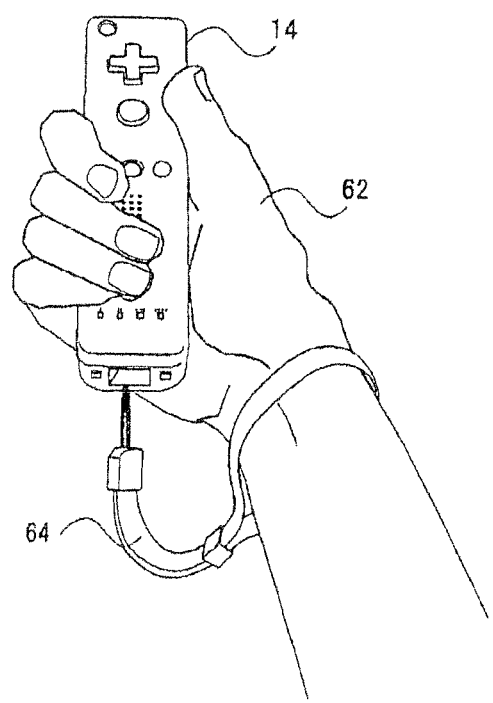
FIG. 3 is an illustrative view showing one form when the controller is utilized.

Accordingly, in the game apparatus of this embodiment, as shown in FIG. 3, a user or a game player holds the controller 14 with a hand 62, and moves the controller 14 to the left, right, top and bottom by swinging the hand 62, and so forth. At this time, it is preferable that the user or player operates the controller 14 with a strap 64 wound on the wrist so as not to drop the controller 14 from the hand 62. Then, from the acceleration sensor, the acceleration data indicating the direction and the size according to the motion at this time of the controller 14 is output.

Furthermore, the controller 14 can instruct (point) the point P (PX, PY) on the screen of the monitor 22 as shown in FIG. 4 by shooting with the solid imager (not illustrated) for infrared rays including infrared rays LED markers 28*a* and 28*b* described before. More specifically, the high-intensity part out of the video signals from the imager is the markers 28*a* and 28*b*, which allows the marker coordinates of the two points to be calculated. The processor of the controller 14 transmits by radio also the coordinate data to the game apparatus 12 as controller data (manipulate signal). When the game apparatus 12 (CPU 40) detects the marker coordinate data from the controller data, it can calculate an instructed position (instructed coordinate) by the controller 14 on the screen 22 and distances from the controller 22 to the respective markers 28*a* and 28*b* on the basis of the marker coordinate data.

As described above, the user or player holds the controller 14 and operates the controller 14 like swinging, so that the controller 14 might interrupt or contact persons or objects around him or her. The controller cover of the present invention intends to protect both of the controller 14 and the other things (including persons and objects) from a shock arising between the controller 14 and the other things.

Figure 5:
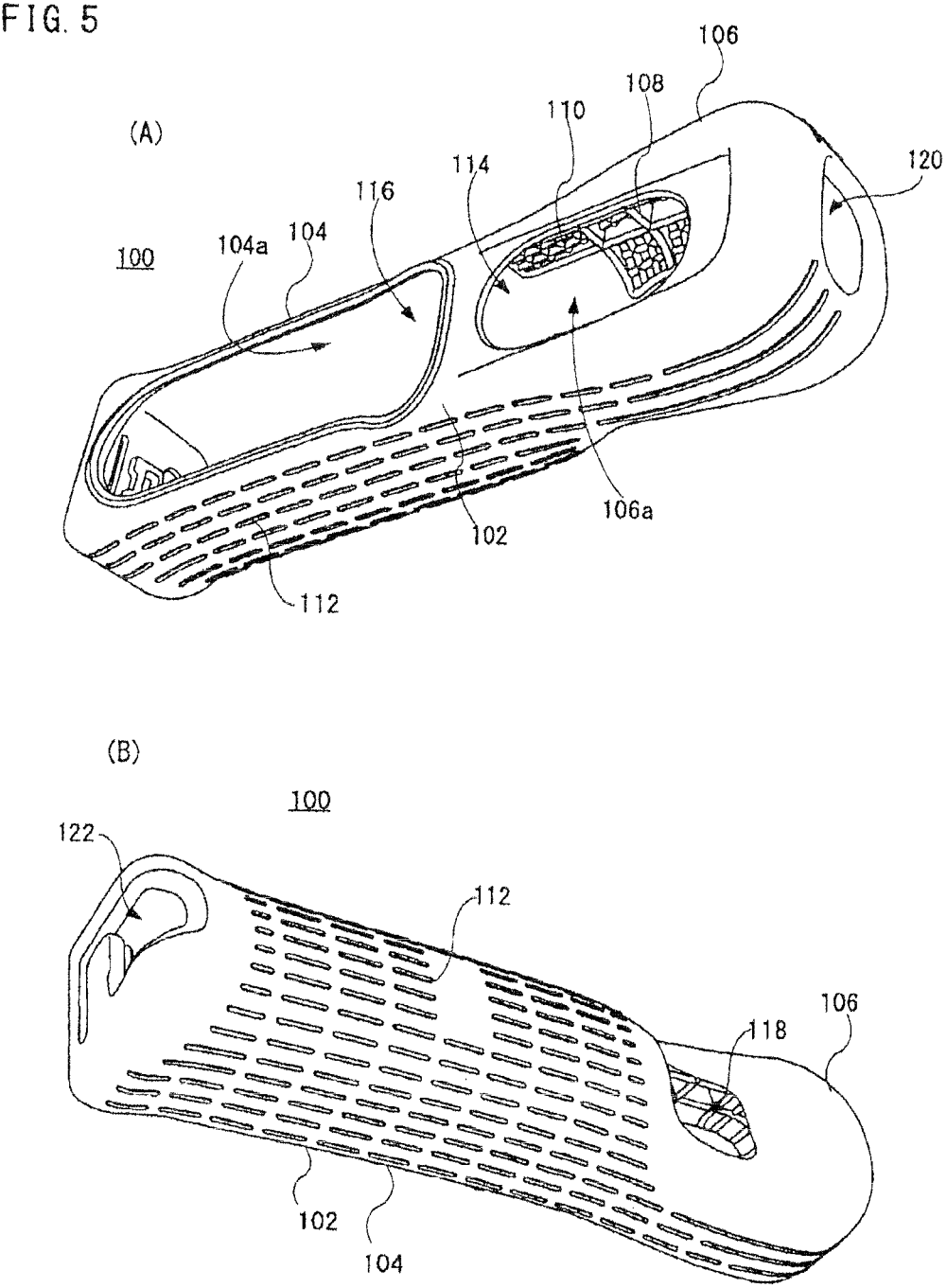
FIG. 5 is an illustrative view showing a controller cover of one embodiment of the present invention.

The controller cover (hereinafter simply referred to as "cover") 100 of one embodiment of the present invention shown in FIG. 5 is attached to the controller 14 shown in FIG. 2. Here, FIG. 5(A) is a perspective view showing a rear surface, a top surface and a right side surface of the cover 100, and FIG. 5(B) is a perspective view showing a front surface, a bottom surface and a left side surface of the cover 100. FIG. 6(A) is a rear view showing the rear surface of the cover 100, FIG. 6(B) is a top view showing the top surface of the cover 100, FIG. 6(C) is a front view showing the front surface of the cover 100, FIG. 6(D) is a left side view showing the left side surface of the cover 100, and FIG. 6(E) is a bottom view showing the bottom surface of the cover 100. FIG. 7(A) is a top view showing the top surface of the cover 100. FIG. 7(B) is a cross-sectional view taken along the line B-B in FIG. 7(A), FIG. 7(C) is a cross-sectional view taken along the line C-C in FIG. 7(A), FIG. 7(D) is a cross-sectional view taken along the line D-D in FIG. 7(A), and FIG. 7(E) a cross-sectional view taken along the line E-E in FIG. 7(A).

FIG. 8(A) is a perspective view showing the rear surface, the top surface and the right side surface of the cover 100 in a state that the cover 100 is attached to the controller 14, and FIG. 8(B) is a perspective view showing the front surface, the bottom surface and the left side surface of the cover 100 in that state. FIG. 9(A) is a top view showing the top surface of the cover 100 in a state that the cover 100 is attached to the controller 14, FIG. 9(B) is a cross-sectional view taken along the line B-B in FIG. 9(A), FIG. 9(C) is a cross-sectional view taken along the line C-C in FIG. 9(A), FIG. 9(D) is a cross-sectional view taken along the line D-D in FIG. 9(A), and FIG. 9(E) is a cross-sectional view taken along the line E-E in FIG. 9(A).

In what follows, the controller cover 100 of this embodiment is described referring to FIG. 5-FIG. 9.

The cover 100 is made of an elastic material like silicon rubber, for example, by an injection molding. It should be noted that an elastic material such as other rubber (butyl rubber, natural rubber, etc.) except for silicon rubber, elastomers, relatively flexible synthetic resin like polyethylene, etc. may be employed. Furthermore, in relation to the molding method, the injection molding is substituted by a compression molding, a potting molding, etc.

Furthermore, the cover 100 is preferably formed to be transparent or translucent because the entire shape of the covered object, that is, the controller 14 and the input means 34 like operating switches of the controller 14 have to be visualized for the user.

In addition, since the cover 100 is attached to the outer surface of the controller 14, the inner surface thereof is the same in size like the length L, the width W and the height H (FIG. 2) as the controller 14 or larger than it. The width, length, and height of the outer surface of the cover 100 are set to be sizes suitable for holding because the user or player holds with the hand the controller 14 attached with the cover 100 on the outer surface. That is, the cover 100 is formed so as to be decreased in thickness (the distance between the outer surface and the inner surface) which is selected between about 1.2 mm-1.5 mm, for example.

The cover 100 has a main body portion 102, and the main body portion 102 is formed with a contacted portion 104 and a non-contacted portion 106 on the inner surface. The contacted portion 104 is formed almost over the entire length of the main body portion 102, and as well understood from FIG. 9(C), FIG. 9(D) and FIG. 9(E), the portion where an inner surface (contacted inner surface 104a) is in contact with the controller 14, i.e., the housing 32 is designated as the contacted portion 104. The frictional force due to the contact between the contacted inner surface 104a and the outer surface of the controller 14 (housing 32) prevents the cover 100 from dropping from the controller 14. The non-contacted portion 106 is a portion where an inner surface thereof (non-contacted inner surface 106a) is not in contact with the outer surface of the controller 14. At the non-contacted portion 106, the non-contacted inner surface 106a has a clearance (space) of certain degree of size with the outer surface of the controller 14. Accordingly, when shock is imparted to the non-contacted portion 106, the non-contacted portion 106 deforms within the clearance, so that shock eased to a certain extent is transmitted to the controller 14. In that sense, the non-contacted portion 106 functions as a shock absorbing portion only because the clearance is formed between the non-contacted inner surface 106a and the outer surface of the controller 14 (housing 32).

While the non-contacted portion 106 functions as a shock absorbing portion as described above, the end portion (one end portion) of the controller 14 is exposed or protruded from the hand when the user or the player holds the controller 14 with one hand. The portion covered with the hand is protected by the hand. However, the end portion of the controller 14 is exposed, so that when the user swings the controller 14, the end portion (one end portion) is subjected to shock because it contacts or interferes with other things (persons and objects) around (in the vicinity of) it, The cover 100 eases at least the shock, and therefore the shock absorbing portion (non-contacted portion in this embodiment) has to be formed so as to cover at least the one end of the controller 14.

It should be noted that for further assuring the function as a shock absorbing portion of the non-contacted portion 106 as specifically understood from FIG. 5(A), FIG. 7(B), FIG. 7(D) and FIG. 7(E) in this embodiment, continuous plate-like (rib-like) elastic deforming protrusions 108 are formed on the non-contacted inner surface 106a of the non-contacted portion 106. The plate-like elastic deforming protrusions 108 are connected in the form of grid in a top view as one example as understood specifically from FIG. 7(D) and FIG. 7(E), and the height h corresponds to the space (clearance) between the non-contacted inner surface 106a of the main body portion 102 and the outer surface of the controller 14 (housing 32) as shown in FIG. 7(B). Accordingly, as well understood from FIG. 9(B), the tips of the elastic deforming protrusions 108 are in contact with the outer surface of the controller 14, so that the elastic deforming protrusions 108 support the controller 14 (housing 32) at those positions. That is, in a case that a clear space is left between the non-contacted inner surface 106a and the outer surface of the controller 14 (although the non-contacted portion functions as a shock absorbing portion in this case also), there is no supporter for supporting the non-contacted inner surface 106a. Thus, in a case that the position is held as shown in FIG. 3, the non-contacted portion 106 very easily deforms, and stability of holding might be reduced. However, as shown in FIG. 9(B), the tips of the elastic deforming protrusions 108 are in contact with the outer surface of the controller 14 (housing 32), and therefore, it is possible to maintain the shape of the non-contacted portion 106 to a certain degree. Thus, the user can securely and surely hold the controller 14 even through the cover 100.

Furthermore, the continuity of the rib-like elastic deforming protrusions 108 imparts strength to the protrusions to thereby permit easy deformation by shock and easy restoration after cancellation of the shock. In a case that the elastic deforming protrusions are made continuous, the protrusion has certain degree of intensity, and therefore, when the controller cover is put out from the metal mold in the injection molding, there is an advantage of preventing the inconvenience of tearing out the protrusions, or the like from occurring.

Other than continuous protrusions being continuous in the form of grid in this embodiment in a top view, the rib protrusions may be continuous in the form of honeycomb, in the form of circle (torus). Furthermore, elastically continuous protrusions are considered in which the plate-like (rib-like) protrusions connected in the form of grid, in the form of honeycomb or in the form of ring are successively or intermittently arranged.

However, the elastic deforming protrusions may not be formed as the continuous ribs in this embodiment, but may be needle-like or rod-like independent elastic deforming protrusions each erratically deforming independently.

Then, in this embodiment, when the controller 14 is moved to the left direction as shown in FIG. 10(A), on assumption that the controller 14 contact or hit the other thing 66 existing on the left side, the non-contacted portion 106 of the cover 100 is subjected to shock from the left direction. At this time, the elastic deforming protrusion 108 of the non-contacted portion 106 of the main body portion 102 deforms by the shock as shown in FIG. 10(B), Thus, the shock is absorbed and eased by the elastic deformation of the elastic deforming protrusion 108 as well as absorbed and eased by elasticity of the rubber as a material of the cover 100 at the main body portion 102 of the cover 100. The shock eased by the cover 100 is transmitted to the controller 14, so that the controller 14 is not damaged. That is, the controller 14 is protected.

On the other hand, since the main body portion 102 of the cover 100 is an elastic material, even if both of them are hit with each other, so large shock is not applied to the other thing 66, and the shock is moreover absorbed or eased by the elastic deformation of the elastic deforming protrusion 108.

The shock eased by the cover 100 is transmitted to the other thing 66, so that the other thing 66 is not damaged. That is, the other thing 66 is also protected.

Thus, according to the cover 100 in this embodiment, it is possible to protect the controller 14 and the other thing 66 from the shock arising between them.

Figure 6:
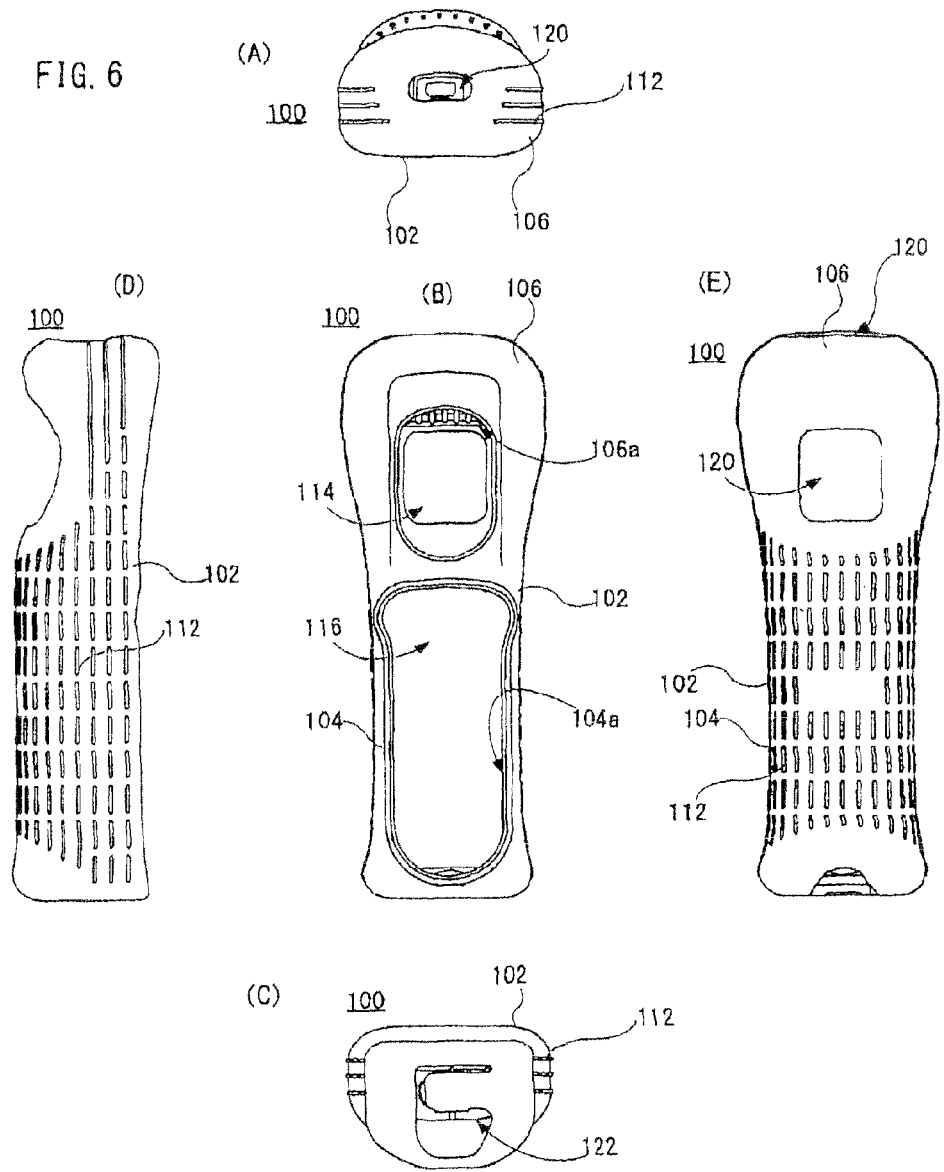
FIG. 6 is an illustrative view showing the controller cover of this embodiment.
Figure 7:
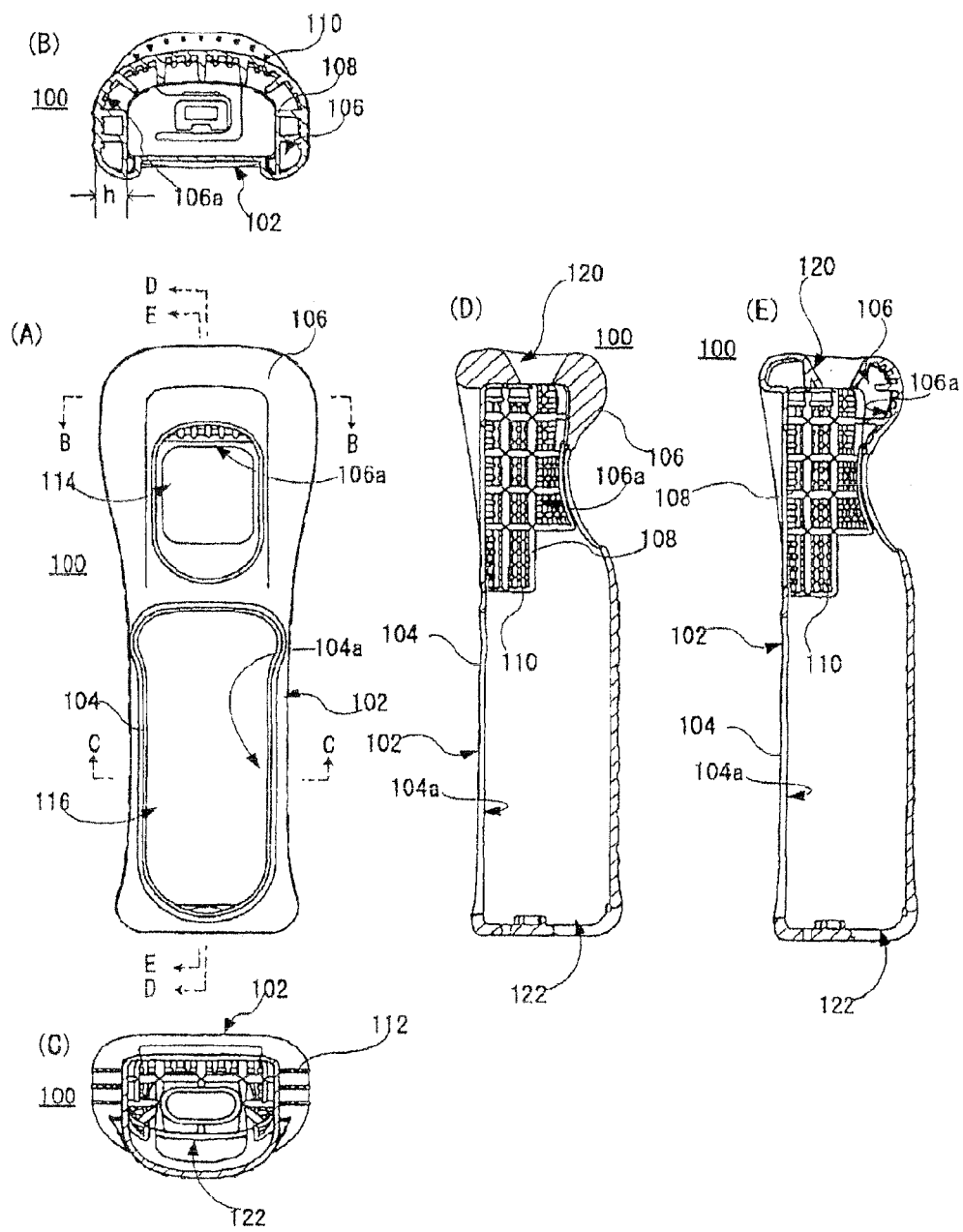
FIG. 7 is an illustrative view showing the controller cover of this embodiment.

In this embodiment, as specifically understood from FIG. 6 and FIG. 7, relatively short protrusions 110 between the elastic deforming protrusions 108 of the non-contacted inner surface 106a are formed, but the short protrusions 110 are not especially provided.

Furthermore, the main body portion 102 of the cover 100 of this embodiment has a contacted portion 104 as described above. At the contacted portion 104, the contacted inner surface 104a is in contact with the outer surface of the controller 14 (housing 32) as shown in FIG. 9(D) and FIG. 9(E). Since the cover 100 is formed by an elastic material like rubber, the frictional force between the contacted inner surface 104a and the outer surface of the controller 14 is large. Thus, the frictional force between them prevents the controller 14 from being detached from the cover 100 and the cover 100 from dropping from the controller 14. The holding force by the user holding the controller 14 also contributes to the prevention of the dropping.

In addition, on the outer surface of the main body portion 102 of the cover 100 in this embodiment, especially, the area corresponding to the left and right side surfaces and the bottom surface of the controller 14, a multiplicity of ridges 112 each extending in the direction of the length L of the controller 14 and being relatively short are formed. The ridges 112 are formed for a non-slip member. In view of a non-slip effect, that is, a non-drop effect of the controller 14 from the hand 62 (FIG. 3), it is more advantageous that the ridges 112 extend in a direction orthogonal to the direction of the length L than in the direction of the length L of the controller 14. However, children may use the controller 14, and the children have small hands. According to the test by the inventors, etc., it is confirmed that that the small ridges 112 extending along the longitudinal direction are much easier to hold for the children with the small hands.

The cover 100 in this embodiment is formed with windows 114 and 116 at an interval on the top surface. The window 114 allows the cross switch 36 and the A button 42 of the controller 14 to be exposed from the cover 100, and the window 116 allows the operation buttons 38-48 to be exposed from the cover 100. Both of them make it easy for the user to operate these operation buttons and switches. However, the window 116 also has an object of not preventing a sound from being released from the speaker through the sound releasing hole 60.

A window 118, which is formed on the bottom surface of the cover 100, is for exposing the B button 52 for easy operation.

A window 120 formed on the end surface (rear surface) of the cover 100 is provided for making it easy for light to be incident to the imager included in the controller 14.

These window 114-120 are not necessarily required, and without malfunction and a problem of operability, these windows 114.quadrature.120 are eliminated and the entire corresponding parts of the controller 14 may be covered with the cover 100.

A window 122 on the front surface of the cover 100 is required when a device for expansion is connected to the expanded connector 54 (FIG. 2) of the controller 14.

Figure 9:
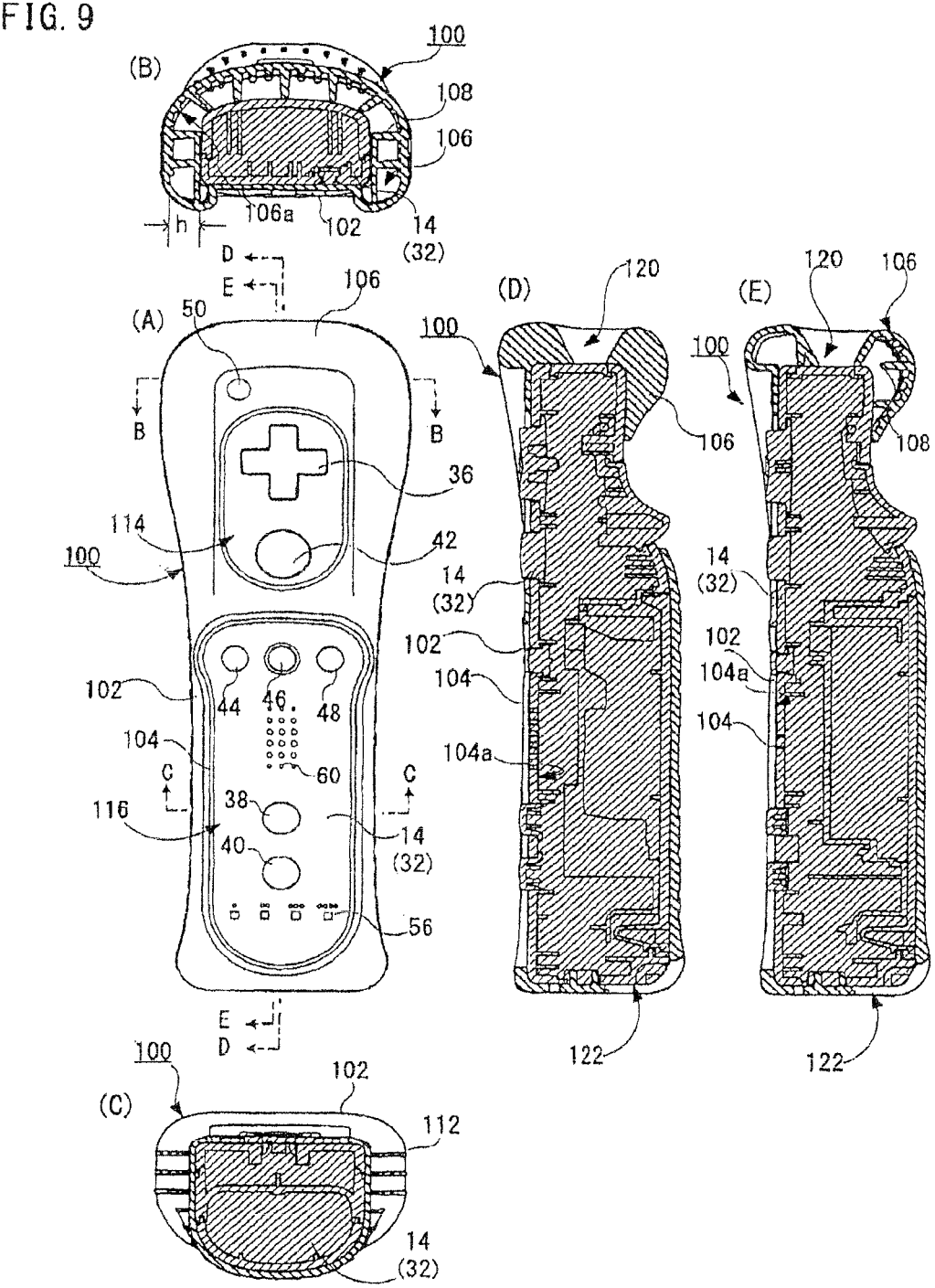
FIG. 9 is an illustrative view showing a state that the controller cover in this embodiment is attached to the controller.

As especially well understood from FIG. 9, in this embodiment now described, the cover 100 is designed in size and shape so as to enclose the controller 14 thought its length. However, in view of the state in which the controller 14 is held with the hand as described in FIG. 3, at least the one tip portion (one end portion) of the controller 14 need only to be protected with the cover. Thus, in a next embodiment, a cover 200 to be attached to only the one end portion of the controller 14 is considered.

Figure 11:
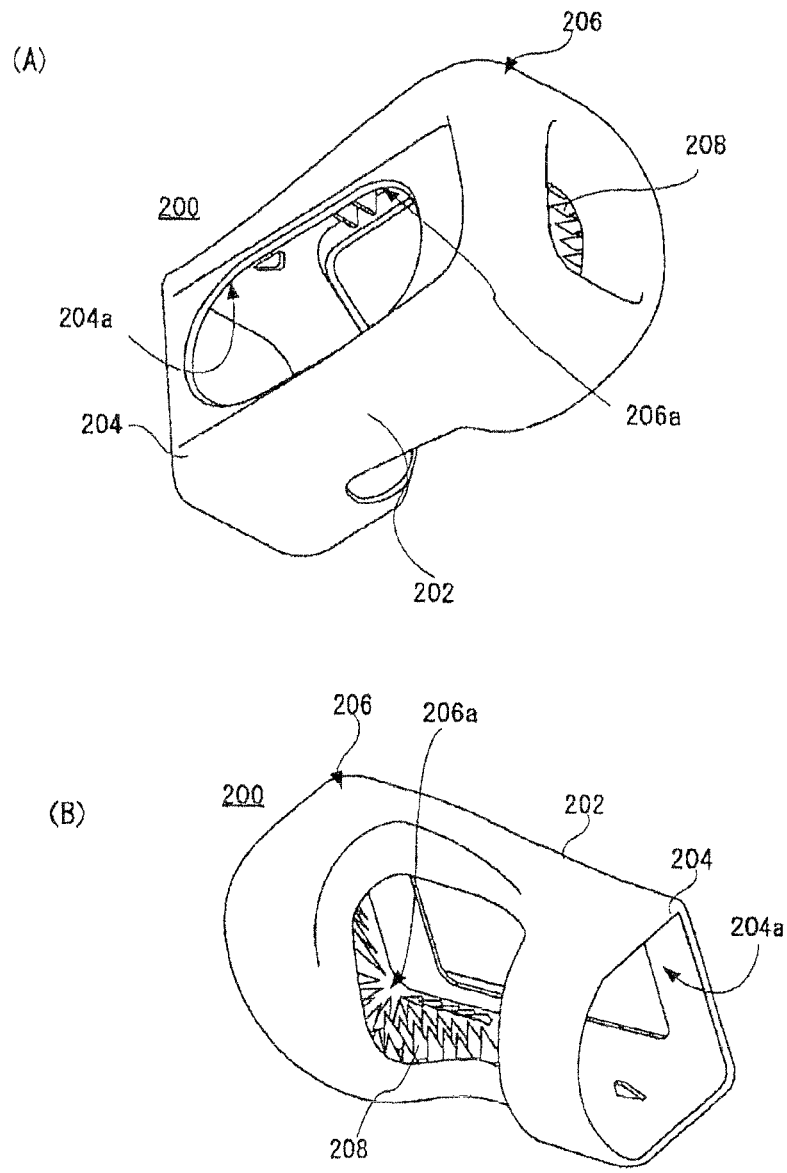
FIG. 11 is an illustrative view showing a controller cover in another embodiment of the present invention.

A controller cover (hereinafter simply referred to as "cover") 200 in another embodiment of the present invention shown in FIG. 11 is attached to the controller 14 shown in FIG. 2. FIG. 11(A) is a perspective view showing a back surface, a top surface and a right side surface of the cover 200, and FIG. 11(B) is a perspective view showing a front surface, a bottom surface and a left side surface of the cover 100. FIG. 12(A) is a perspective view showing a back surface, a top surface and a right side surface of the controller 14 in a state that the cover 200 is attached to the controller 14, and FIG. 12(B) is a perspective view showing a front surface, a bottom surface and a left side surface in that state. In what follows, with reference to FIG. 11-FIG. 12, the cover 200 of this embodiment is described.

The cover 200 is also made of silicon rubber by injection molding similar to the cover 100 in the previous example. The cover 200, which is for covering a part of the controller 14, may be formed by an opaque member rather than the transparent (translucent) member.

In addition, the inner surface of the cover 200 is the same in size like the width W and the height H as or larger than the controller 14. The length may adequately be set, but is set to be from the one tip portion (one end portion) of the controller 14 to the position nearer to the other end portion than the A button 42 in this embodiment. Furthermore, the cover 200 is formed so as to decrease in thickness.

The cover 200 has a main body portion 202, and the main body portion 202 is formed with a contacted portion 204 and a non-contacted portion 206 on its inner surface. The contacted portion 204 is formed over only the part of the main body portion 202, and as understood from FIG. 12, the inner surface (contacted inner surface 204a) at that portion is in contact with the outer surface of the controller 14, i.e., the housing 32. The frictional force due to the contact between the contacted inner surface 204a and the outer surface of the controller 14 (housing 32) prevents cover 200 from dropping from the controller 14. The non-contacted portion 206 is a portion where the inner surface thereof (non-contacted inner surface 206a) is not in contact with the outer surface of the controller 14. The non-contacted inner surface 206a has a clearance (space) of certain degree of size with the outer surface of the controller 14. Accordingly, similar to the precedent embodiment, the non-contacted portion 206 functions as a shock absorbing portion only because the clearance is formed between the non-contacted inner surface 206a and the outer surface of the controller 14 (housing 32).

For further assuring the function as a shock absorbing portion of the non-contacted portion 206, similar to the previous embodiment, as well understood especially from FIG. 11(B), elastic deforming protrusions 208 are provided on the non-contacted inner surface 206a of the non-contacted portion 206. Each of the plate-like elastic deforming protrusions 208 is formed as a needle-like independent protrusion as one example. In the embodiment described before, if the cover 100 with long length has such independent protrusions, such a problem easily arises as tear of the independent protrusions when the cover 100 is molded and pulled out from a metal mold. However, in this embodiment, the cover 200, which is short, is formed with the elastic deforming protrusions 208 as the independent protrusions, the problem in molding never arises. However, the elastic deforming protrusions 208 may of course be formed as the continuous protrusions.

Since the operation and the advantage of the elastic deforming protrusion 208 are the same as those in the elastic deforming protrusion 108 of the cover 100 in the previous embodiment, a duplicated description will be omitted.

Figure 13:
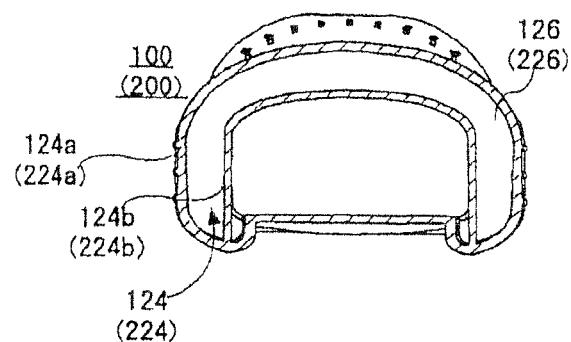
FIG. 13 is an illustrative view showing an important part of a controller cover in a further embodiment of the present invention.

FIG. 13 is an illustrative view showing an important part of the invention in a further embodiment of the present invention, and this embodiment can be applied to the cover 100 and the cover 200, and therefore, if this is applied to the cover 200, corresponding reference numerals are merely written in brackets in FIG. 13.

In the embodiment in FIG. 13, a double wall surface portion 124 is formed at the portion corresponding to the non-contacted portion 106 of the cover 100. The double wall surface portion 124 is enclosed by an outer wall surface 124a and an inner wall surface 124b, in which a shock absorbing material 126 including gas like air (or other gases), liquid like noncombustible oil and gel-like material are enclosed. The buffer power of the shock absorbing material 126 eases shock.

However, in a case that the enclosed shock absorbing material 126 is air, it is considered that by opening fine holes not shown on the wall surface 124a and/or 124b, the hardness (magnitude of the buffer power) of the shock absorbing portion can be adjusted.

Figure 14:
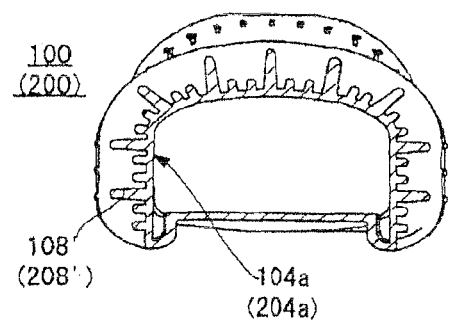
FIG. 14 is an illustrative view showing an important part of a controller cover in a further another embodiment of the present invention.

In the embodiment in FIG. 14, the non-contacted portion of the cover 100 is eliminated to make it the contacted portion 104 (204) entirely, and elastic deforming protrusions 108' are formed on the outer surface of the contacted inner surface 104a. It is confirmed that even if the elastic deforming protrusions may be formed on the inner surface of the non-contacted inner surface as in the previous two embodiments, or the elastic deforming protrusions 108' may be formed on the outer surface of the contacted inner surface 104a like this embodiment, a shock absorbing effect by the elastic deforming protrusion 108' can be expected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller cover to cover a controller which a user holds and moves to generate operation information in accordance with the movement of the controller, the controller comprising an elongate housing having a first end and a second end opposite the first end and a plurality of user-manipulable operation elements, the controller cover comprising:
    a main body portion having an outer surface;
    a shock absorbing portion formed around said main body portion;
    a first end portion structured to cover the controller at the first end;
    a second end portion structured to cover the controller at the second end; and
    first and second openings in the controller cover, the first and second openings being located in the controller cover such that each of the user-manipulable operation elements of the controller is exposed therethrough when the controller cover is covering the controller,
    wherein said main body portion includes a portion having a contacted inner surface being in contract with an outer surface of said controller and non-contacted portion having a non-contacted inner surface not being in contact with said outer surface of said controller, said shock absorbing portion being formed at said non-contacted portion.

2. The controller cover according to claim 1, wherein the first and second openings are formed in a top surface of the controller cover.

3. The controller cover according to claim 1, wherein the first opening is formed in a top surface of the controller cover, and the second opening is formed in a bottom surface of the controller cover.

4. The controller cover according to claim 1, wherein one of the first and second openings is arranged to expose an LED located in the housing of the controller when the controller cover is covering the controller.

5. The controller cover according to claim 1, wherein at least one of the user-manipulable operation elements is configured to receive four-direction input.

6. The controller cover according to claim 5, wherein the at least one user-manipulable operation element that is configured to receive four-direction input is a cross-switch.

7. The controller cover according to claim 1, further comprising a third opening formed in the second end portion of the controller cover in a location that, when the controller cover is covering the controller, corresponds to a connector located at the second end of the controller.

8. The controller cover according to claim 1, wherein one of the first and second openings is arranged to expose a speaker located in the housing of the controller when the controller cover is covering the controller.

9. The controller cover according to claim 1, wherein an imager is disposed within the elongate housing of the controller proximate to the first end of the controller.

10. The controller cover according to claim 9, further comprising a window formed in the first end portion of the controller cover in a location that, when the controller cover is covering the controller, corresponds to the imager.

11. The controller cover according to claim 1, wherein when the controller cover is covering the controller, at least one of user-manipulable operation elements is exposed through the first opening and at least one other of the user-manipulable operation elements is exposed through the second opening.

12. The controller cover according to claim 11, wherein the main body portion is sized and shaped to cover the controller in its entirety.

13. The controller cover according to claim 1, further comprising:
    a window formed in the first end portion of the controller cover in a first location that, when the controller cover is covering the controller, corresponds to an imager disposed within the elongate housing of the controller proximate to the first end of the controller, the first and second end portions of the controller cover being opposite one another; and
    a third opening formed in the second end portion of the controller cover in a second location that, when the controller cover is covering the controller, corresponds to a connector located at the second end of the controller.

14. A controller cover utilized for a controller which a user holds and moves to thereby output operation information in accordance with the motion, comprising:
    a main body portion made of an elastic material, and attached to an outer surface of said controller; and
    a shock absorbing portion formed around said main body portion, wherein said main body portion includes a portion having a contacted inner surface being in contract with an outer surface of said controller and non-contacted portion having a non-contacted inner surface not being in contact with said outer surface, said shock absorbing portion is formed at said non-contacted portion, and wherein said shock absorbing portion includes elastic deforming protrusions formed on said non-contacted inner surface, and said elastic deforming protrusions are brought into engagement with said outer surface of said controller.

15. The controller cover according to claim 14, wherein said elastic deforming protrusions include continuous protrusions.

16. The controller cover according to claim 14, wherein said elastic deforming protrusions include independent protrusions each deforming independently.

* * * * *